(12) United States Patent
Andrews et al.

(10) Patent No.: US 8,856,571 B2
(45) Date of Patent: *Oct. 7, 2014

(54) ADJUSTING DEVICE PERFORMANCE OVER MULTIPLE TIME DOMAINS

(75) Inventors: Jonathan J. Andrews, San Jose, CA (US); Romit Dasgupta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/488,669

(22) Filed: Jun. 5, 2012

(65) Prior Publication Data

US 2012/0260083 A1 Oct. 11, 2012

Related U.S. Application Data

(63) Continuation-in-part of application No. 13/080,280, filed on Apr. 5, 2011, now Pat. No. 8,572,421.

(51) Int. Cl.
| | |
|---|---|
| *G06F 1/00* | (2006.01) |
| *G06F 1/26* | (2006.01) |
| *G06F 15/00* | (2006.01) |
| *G09G 5/00* | (2006.01) |
| *H04N 5/93* | (2006.01) |
| *G01R 25/00* | (2006.01) |
| *G01R 11/30* | (2006.01) |
| *G06F 1/32* | (2006.01) |
| *G06F 9/50* | (2006.01) |

(52) U.S. Cl.
CPC ............ *G06F 1/3228* (2013.01); *G06F 1/3296* (2013.01); *G06F 9/5094* (2013.01); *G06F 1/324* (2013.01)
USPC ............ 713/323; 713/320; 702/79; 702/182; 345/501; 345/619; 386/353

(58) Field of Classification Search
USPC ............ 713/320, 323; 702/79, 182; 345/501, 345/619; 386/353
See application file for complete search history.

(56) References Cited

U.S. PATENT DOCUMENTS

| | | | |
|---|---|---|---|
| 5,396,635 A | 3/1995 | Fung | |
| 6,513,124 B1 * | 1/2003 | Furuichi et al. | ............... 713/322 |
| 6,825,711 B2 | 11/2004 | Cohn et al. | |
| 6,889,331 B2 | 5/2005 | Soerensen et al. | |
| 7,017,060 B2 | 3/2006 | Therien et al. | |
| 7,254,721 B1 * | 8/2007 | Tobias et al. | ................... 713/300 |
| 7,814,485 B2 | 10/2010 | Morgan et al. | |
| 7,898,297 B2 | 3/2011 | Kapoor et al. | |
| 8,239,697 B2 * | 8/2012 | Verdun | ......................... 713/300 |
| 8,572,421 B2 * | 10/2013 | de Cesare et al. | ............. 713/323 |
| 2011/0126056 A1 * | 5/2011 | Kelleher et al. | .................. 714/42 |

* cited by examiner

*Primary Examiner* — Vincent Tran

(74) *Attorney, Agent, or Firm* — Meyertons, Hood, Kivlin, Kowert & Goetzel, P.C.

(57) ABSTRACT

Adjusting processor performance based on processing profiles. The method may determine that a process has entered a processing state after an idle state. In response to entering the processing state the processing time of the processor may be monitored. In response to the processing time exceeding a first threshold of time, the performance of the processor may be increased from a first level to a second level. In response to the processing time exceeding a second threshold time, the performance of the processor may be decreased from the second level to a third level. In response to the processing time exceeding a third threshold time, the performance of the processor may be increased from the third level to a fourth level. In response to the processing time exceeding a fourth threshold time, the performance of the processor may be decreased from the fourth level to a fifth level.

25 Claims, 7 Drawing Sheets

ADJUSTING DEVICE PERFORMANCE OVER MULTIPLE TIME DOMAINS

PRIORITY INFORMATION

This application is a continuation-in-part of U.S. patent application Ser. No. 13/080,280, titled "Adjusting Device Performance Based on Processing Profiles," filed Apr. 5, 2011 now U.S. Pat. No. 8,572,421, whose inventors were Josh P. de Cesare and Jonathan J. Andrews, and which is hereby incorporated by reference in its entirety as though fully and completely set forth herein.

BACKGROUND

1. Field of the Invention

This invention relates to device performance, and more particularly, to methods and mechanisms to adjust device performance over multiple time domains.

2. Description of the Related Art

In recent years, a multitude of electronic devices have been created and used. Circuit designers for such devices have focused on providing and improving efficiency in these devices, and particularly on methods for monitoring and controlling power consumption of devices that use batteries. However, the efficient use of power in these devices must be balanced with providing desired performance, e.g., of software executing on the devices.

Existing power management technology, such as dynamic voltage control (DVC)/p (power) state stepper, DVFM, simply increase performance as processing time increases. However, such power management schemes "reward" (by providing greater performance to) applications which execute for long periods of times, without taking into account the types of applications executing within certain time domains. Accordingly, well-designed applications, which may not have excessive processing times, may not receive the increased performance that poorly designed applications receive. Thus, improvement in power management is desired.

SUMMARY

Various embodiments are described of a method for adjusting device performance based on processing profiles.

In one embodiment, at least a first, second threshold, and third threshold may be determined for adjusting performance of a device. The device may be a circuit, such as a processor (e.g., a CPU, GPU, microprocessor, etc.), encoder, decoder, DSP, image signal processor, etc., although devices other than circuits are envisioned.

In some embodiments, the first threshold may be determined by generating processing profile(s) of one or more applications which are executed, at least in part, by the circuit. For example, the processing profile may include a histogram of processing times of the application, each time it exits an idle state. The first threshold may be determined from the processing profile(s) as the processing time after which most or all applications with low processing requirement complete processing. In one embodiment, this time may be established by analyzing modes of the histogram's distribution.

The second threshold may be determined based on a desired characteristic, e.g., of the application(s) being executed by the circuit. For example, the desired characteristic may be a graphics frame rate (e.g., 60 fps, 30 fps, etc.). For the specific example of 60 fps, the second threshold may be determined to be 16.6 ms.

The third threshold may be determined based processing length for high processing applications (e.g., non-user performance applications), e.g., using the processing profile(s) discussed above. These applications may be computationally intense and require high performance to complete in an appropriate time frame. For example, these applications may include benchmark applications, graphics applications, HDR (High Dynamic Range) image processing, complete mathematic routines, etc. In one embodiment, the first and second threshold may be within a first time domain (e.g., milliseconds, or less than a second). However, these high processing applications may execute to and through a second time domain (e.g., within the "seconds" time domain). However, it is possible that a different threshold may be used, e.g., within the first time domain, but potentially close to the second time domain, depending on optimizations for performance of the high processing applications, battery considerations, thermal considerations, etc.

The performance of the circuit may then be adjusted using the first, second, and third thresholds. More specifically, the method may determine when the circuit has entered a processing state (e.g., after exiting an idle state). Initially, the circuit may operate at a first processing level (e.g., a low processing level). If the processing time of the circuit exceeds the first threshold within the processing state, the performance level of the circuit may be increased to a second processing level (e.g., a high processing level). The second processing level may be a processing level that is unsustainable (e.g., due to battery requirements, temperature requirements, etc.). If the processing time of the circuit exceeds a second threshold (within the same processing state), the performance level of the circuit may be decreased to a third processing level (e.g., a mid processing level). Additionally, the second processing level may be greater than the first processing level.

Finally, after reaching the third threshold, the processing level may be increased, e.g., to the second processing level, for the high computation applications. Later thresholds and processing levels may be used to decrease the processing level after the high computation applications finish, e.g., to the third processing level, such as in a third time domain.

The method may be repeated each time the circuit enters a processing state.

BRIEF DESCRIPTION OF THE DRAWINGS

The following detailed description makes reference to the accompanying drawings, which are now briefly described.

Figure 1A:
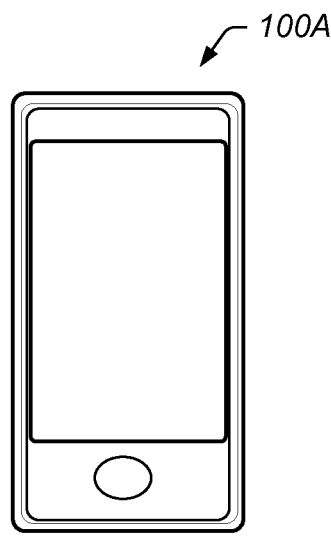
FIGS. 1A and 1B illustrates exemplary systems, according to various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory media which may reside in different locations, e.g., in different computers that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Portable Device—any of various types of computer systems which are mobile or portable, including portable gaming devices (e.g., Nintendo DS™, PlayStation Portable™, Gameboy Advance™, iPhone™), laptops, PDAs, mobile telephones, handheld devices, portable Internet devices, music players, data storage devices, etc. In general, the term "portable device" can be broadly defined to encompass any electronic, computing, and/or telecommunications device (or combination of devices) which is easily transported by a user.

Communication Device—any of various devices which are capable of communicating with other devices, e.g., wirelessly. Communication Device is a superset of portable devices with communication capabilities (e.g., a Communication Device may be portable or stationary). Communication devices include cell phones, wireless access points (e.g., wireless routers) and other devices capable of communicating with other devices.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1B:
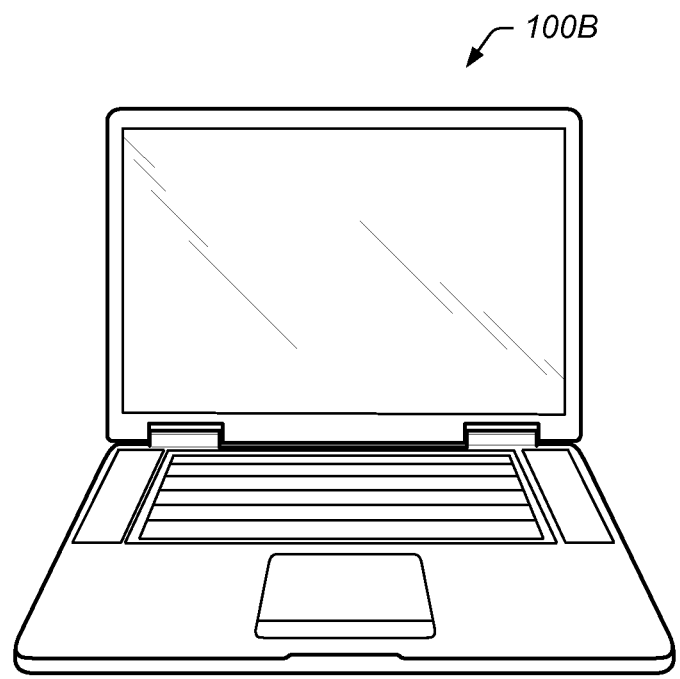
Figure 2:
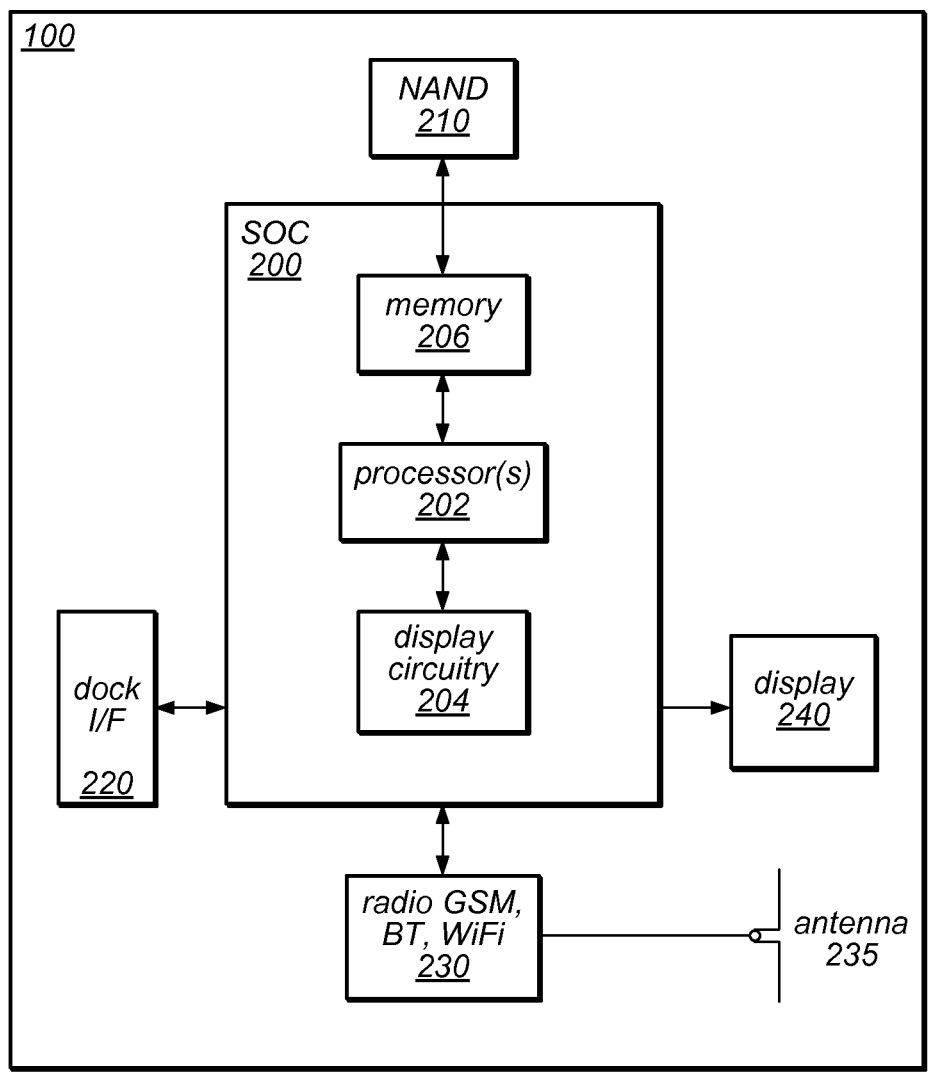
FIG. 2 is a block diagram of an exemplary device, according to one embodiment.

FIGS. 1A-2—Exemplary Systems and Block Diagram

FIGS. 1A and 1B illustrate exemplary systems that may implement embodiments described herein. More particularly, FIGS. 1A and 1B illustrate exemplary devices 100A and 100B (referred to collectively as "device 100"). The device 100 may be any of various devices. For example, the device 100 may be a portable or mobile device, such as a mobile phone (e.g., 100A in FIG. 1A), PDA, audio/video player, etc. The device may also be any of various other devices, such as computer systems, laptops (e.g., 100B in FIG. 1B), netbooks, tablets, etc. In one embodiment, the device 100 may be a wireless device that is configured to communicate with other devices (e.g., other wireless devices, wireless peripherals, cell towers, access points, etc.) using one or more wireless channels. As used herein, a "wireless device" refers to a device that is able to communicate with other devices or systems using wireless communication. For example, the device 100 may be configured to utilize one or more wireless protocols, e.g., 802.11x, Bluetooth, WiMax, CDMA, GSM, etc., in order to communicate with the other devices wirelessly. In embodiments described herein, the device 100 may be configured to control performance of one or more processors of the device 100.

As also shown in FIGS. 1A and 1B, the device 100 may include a display, which may be operable to display graphics provided by an application executing on the device 100. The application may be any of various applications, such as, for example, games, internet browsing applications, email applications, phone applications, productivity applications, etc. The application may be stored in a memory medium of the device 100. As described below, the device 100 may include a processor (e.g., a CPU) and display circuitry (e.g., including a GPU) which may collectively execute these applications.

FIG. 2 illustrates an exemplary block diagram of the device 100. As shown, the device 100 may include a system on chip (SOC) 200, which may include portions for various purposes, including processor 202, display circuitry 204, and memory medium 206. As also shown, the SOC 200 may be coupled to various other circuits of the device 100. For example, the device 100 may include various types of memory (e.g., including NAND 210), a dock interface 220 (e.g., for coupling to the computer system 150), the display 240, and wireless communication circuitry (e.g., for GSM, Bluetooth, WiFi, etc.) which may use antenna 235 to perform the wireless communication. As described herein, the device 100 may include hardware and software components for monitoring processing states and modifying performance.

Figure 3:
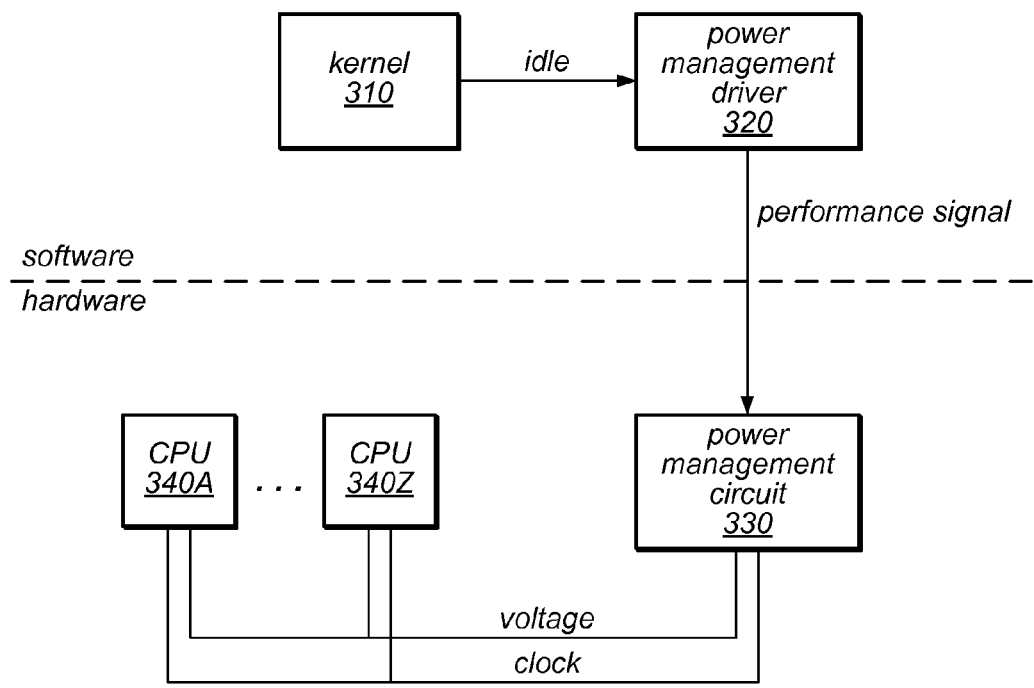
FIG. 3 is a block diagram of one embodiment of a components for implementing processor performance adjustment.

FIG. 3—Block Diagram of Illustrating Operation of Components of Device 100

FIG. 3 illustrates one embodiment of a block diagram illustrating operation of components of device 100. As shown, the device 100 may include hardware, such as processors 340A-340Z (note that the letters do not represent a specified number of processors, but only indicate that there may be one or more or multiple processors, as desired) and power management circuit 330. The device 100 may also include software components, e.g., which are executed by one or more of the processors 340A-340Z. As shown, the software components include kernel 310 and power management driver 320.

In the embodiment of FIG. 3, the kernel 310 may monitor and/or report the current state of the processors 340A-340Z. For example, kernel 310 may indicate when the processor enters an idle state or exits an idle state (which may also be referred to as "entering a processing state"). The kernel 310 may indicate this information to power management driver 320. The power management driver 320, in turn, may use this information (e.g., as described in embodiments below) and/or other information to determine a desired performance level of the processors 340A-340Z. Once the desired performance level has been determined, the power management driver 320 may provide a signal to power management circuit 330 to modify the performance of the processors 340A-340Z. For example, the power management circuit 330 may change the clock speed and/or voltage of the processors 340A-340Z to change the performance of the processors 340A-340Z.

In one embodiment, the power management driver 320 may directly specify the desired voltage and/or clock speed. Alternatively, the power management driver 320 may indicate a performance level and the power management circuit 330 may use the performance level to determine a voltage and/or clock speed for the processors 340A-340Z. Note that the power management driver 320 may provide such signals for individual ones of the processors 340A-340Z, for groups of the processors 340A-340Z, and/or for all of the processors 340A-340Z. as desired. Further, the processors 340A-340Z may be any of various types of processors, such as general purpose processors, graphics processors, etc.

Thus, FIG. 3 illustrates an exemplary block diagram illustrating one embodiment of operation of software and hardware components of the device 110. Further embodiments are envisioned where various components are added, removed, combined, or modified according to various different configurations. For example, systems are envisioned where the monitoring of the processor state and/or the determination of the desired processing level is determined in hardware rather than software.

Figure 4:
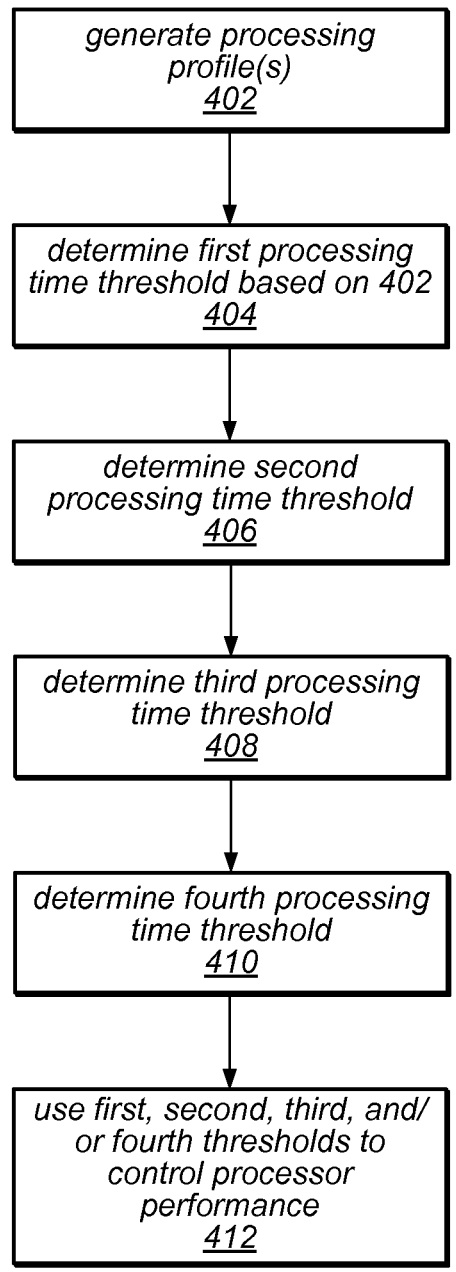
FIG. 4 is a flow diagram of one embodiment of a method for determining thresholds for controlling processor performance.

FIG. 4—Determining Thresholds for Controlling Processor Performance

FIG. 4 illustrates one embodiment of a method for determining thresholds for controlling processor performance. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

Figure 5A:
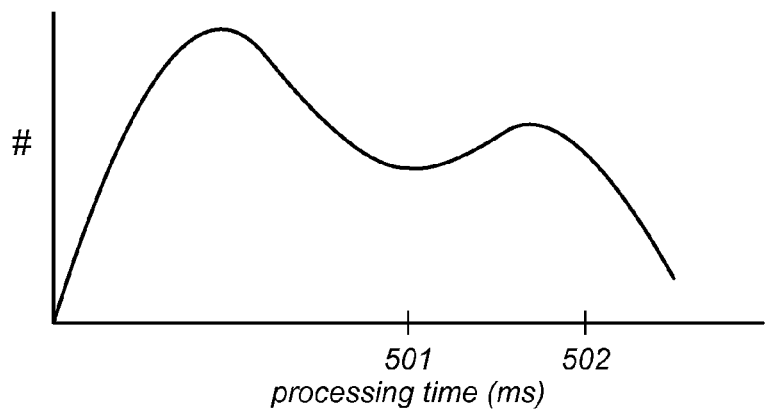
FIGS. 5A-5D are exemplary processing profiles, according to various embodiments.
Figure 5B:
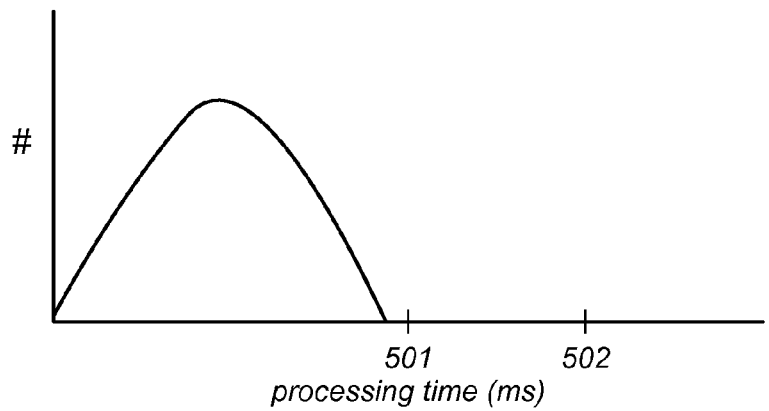
Figure 5C:
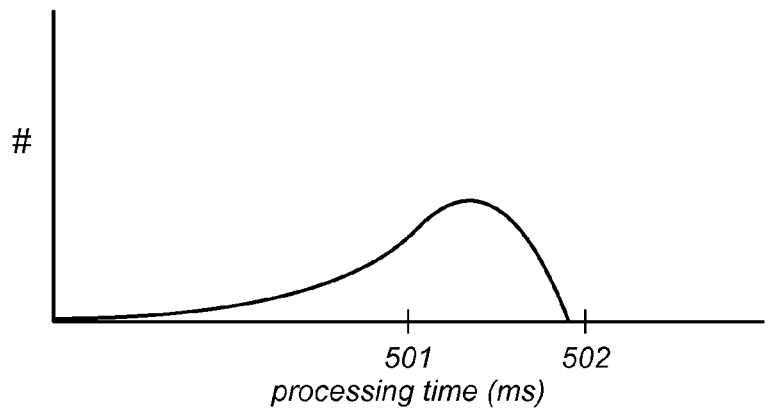
Figure 5D:
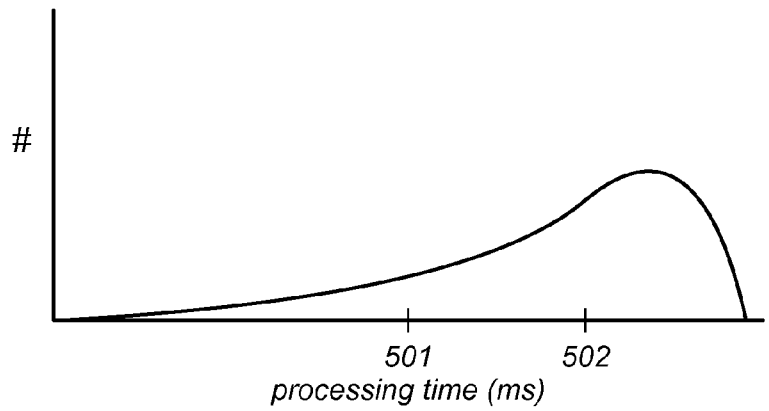

In 402, one or more processing profiles may be generated. The processing profiles may be generated according to any of a variety of manners. For example, in one embodiment, processing profiles may be generated for each of multiple different applications and/or may be generated in aggregate for the whole of the multiple applications. FIG. 5A illustrates an aggregated processing profile and FIGS. 5B-5D illustrate exemplary processing profiles for different types of applications (either for single applications or multiple applications of the same type), described in more detail below.

In one embodiment, a processing profile may be generated by executing an application one or more times and monitoring the processing state of the processor(s) executing the application over time. The processing state may be monitored by recording the length of processor activity each time the processor enters an idle state. This length of processor activity may be referred to as a "processing time", which is the period of time between the monitored processor(s) exiting a previous idle state and entering a next idle state. Said another way, the "processing time" is the length of time the processor(s) are in a processing state, delineated by the end of one idle state and the beginning of another idle state. Accordingly, a processing profile for an application may be generated by creating a histogram of these processing times for the respective application (or for multiple applications, depending on the embodiment).

In one specific embodiment, the processing profile may be generated by using a processor instruction (e.g., clz for ARM based processors or ffs for Intel based processors, although other types of processors are envisioned) to efficiently calculate a log base 2 of a processing time each time the processor enters an idle state. The log of the processing times may then be used to create a histogram of the processing times, thereby creating a processing profile. Processing profiles may be generated offline using the processing times or may be generated dynamically (or "on the fly") during run time. Processing profiles generated during run time may be particularly useful for embodiments where thresholds are generated and/or modified dynamically, described in more detail below.

Various different applications may have different processing profiles. For example, music or video applications may have short processing profiles, where most or all of the processing during each processing time is completed in less than, for example, 4 ms, although other times are possible. Applications which have low processing times (in terms of time) may be referred to as applications with "low processing requirements". The time frame for determining whether an application has low processing requirements or high processing requirements may be determined according to a variety of manners. For example, the time frame may be the maximum processing time of the lowest 30%, 25%, 30%, 35%, 40%, 50%, etc. of application processing times. Additionally, or alternatively, the time frame may be determined by analyzing the distribution of aggregated processing profiles, e.g., where the low processing requirement applications are specified by the end of the first distribution mode of multiple distribution modes, although embodiments where the low processing requirement applications include more than the first distribution mode (e.g., the first two distribution modes) are also envisioned.

As indicated above, FIG. 5A is an exemplary aggregated processing profile that includes a bimodal distribution of processing times. In the example of FIG. 5A, those applications that have processing times within the first mode (delineated via time 501) may be considered applications with "low processing requirements". FIG. 5B illustrates an exemplary processing profile of an application (or an aggregate application profile for multiple applications) having low processing requirements. As shown, the application(s) all have processing times less than the time 501, which may be 2 ms, 4 ms, 6 ms, 10 ms, etc. depending on the analysis for determining the time.

Other applications, such as games, Internet browsing, email browsing, etc. may have longer processing profiles, which may be referred to as applications "medium processing requirements" or "high processing requirements", or even "variable processing requirements" depending on the consistency of the processing times. FIGS. 5C and 5D illustrate processing profiles of an exemplary set of such applications.

There may be a set of applications which involve computationally intensive algorithms, which may be included in the "high processing requirement" applications. These applications may execute in a different time domain than the "low processing requirement" applications and the "medium processing requirement" applications. For example, the low processing requirement applications may execute within the ms time domain (e.g., less than 5, 10, 15 ms). Similarly, the medium processing requirement applications may have processing times within the ms domain (e.g., in the 13-50 ms range, or even hundreds of ms range). However, these high processing requirement applications may have processing times in a different time domain, e.g., for seconds at a time rather than milliseconds. Exemplary high processing applications include benchmark applications, graphics applications, HDR (High Dynamic Range) image processing, complete mathematic routines, etc.

In 404, a first processing time threshold may be determined based on the one or more processing profiles. The first processing time threshold may be specified as the maximum endpoint of the time frame associated with applications having low processing requirements. Alternatively, the first processing time may be specified as a number of standard deviations (e.g., 4) from the average processing time of these applications. In such embodiments, the first processing time threshold may be determined by determining the time associated with applications having low processing requirements, as described above.

However, the first processing time threshold may not be associated with these low processing requirement applications, but may be instead determined in various other manners. Nonetheless, the first processing time threshold may still be determined in a manner similar to that associated with the applications having low processing requirements, e.g., via determining a bottom 25%, 30%, 35%, 40%, 50% etc. of the processing times, selecting a bottom number of modes (e.g., 1, 2, 3, etc.) modes in the aggregate distribution, etc. Thus, the first processing time threshold and the low processing requirement applications may be determined via similar manners, but may still be distinct. For example, the first processing time may include the first two modes of the aggregate distribution while the low processing requirement time frame may be the bottom 20% of processing times. Other combinations are envisioned.

In FIGS. 5A-5D, 501 illustrates both an exemplary first processing time threshold and the endpoint of the time frame defining low processing requirement applications.

In 406, a second processing time threshold may be determined. According to various embodiments, the second processing time threshold may be defined based on the processing profile(s) of 402 or not. For example, in one embodiment, the second processing time threshold may be determined using the processing profile(s) of 402, but using a higher value criteria than the first processing time threshold (e.g., the endpoint of the bottom 40% rather than the bottom 20%, or the maximum of a greater number of modes than the first processing time threshold).

However, in other embodiments, the second processing time threshold is not based on the processing profile(s) of 402. Instead, the second processing time threshold may be defined based on a desired characteristic of applications executing on the device. In one embodiment, the desired characteristic may be a target frame rate of applications executing on the device. For example, a graphics frame rate of 60 frames per second (fps) or greater may be desirable, e.g., so that execution of the applications on the device appears "smooth" or does not appear to have stutters (where the interface jerks from one position to the next) to a user of the device. Other graphics frame rates may also be desirable, e.g., a graphics frame rate of greater than 30 fps. For a desired characteristic of 60 fps, the second processing time threshold may be defined as approximately 16 ms (1000 ms/60=16.6 ms). Alternatively, for a desired characteristic of 30 fps, the second processing time threshold may be defined as 33 ms (1000 ms/30=33.3 ms).

Turning now to FIGS. 5A-5D, 502 illustrates an exemplary second processing time threshold. As shown in FIG. 5A, applications having low processing requirements (with processing profiles such as shown in FIG. 5B) are completed by the time 501. FIGS. 5C and 5D illustrate processing profiles of applications that require further processing times, e.g., for games, Internet browsing, email browsing, and/or other applications. As an example, 502 may be defined as 16.6 ms based on a target graphics frame rate of 60 fps. In the exemplary processing profile of FIG. 5B, the application may generate a frame during each processing state and may successfully achieve a frame rate of 60 fps since the processing time is less than the second interval 502. However, the application associated with the processing profile of FIG. 5C may not achieve such a rate, since the processing time exceeds the second processing time threshold 502.

In 408, a third processing time threshold may be determined. The third processing time threshold may be particularly suitable for the high processing requirement applications, particularly those with computational intensive algorithms (e.g., such as HDR processing, benchmarks, etc.). These algorithms may have relatively long processing times compared to the low processing requirement applications, e.g., processing times of seconds rather than milliseconds.

Similar to 406 above, the third processing time threshold may be determined via the processing profiles (e.g., based on a standard deviation or percentage calculation of the distribution) or may be determined in a more qualitative manner. For example, the third threshold may be determined based on the knowledge that the computational intensive algorithms execute over a longer period than the other applications discussed above, e.g., and require higher processing power, as discussed below.

Further, in 410, a fourth processing time threshold may be determined. The fourth processing time threshold may be based on the completion of the computationally intensive algorithms discussed above. For example, this threshold may be used for when those types of applications should have completed. Further, the threshold may be used to limit battery consumption or thermal issues (e.g., over-heating), as discussed below. In one embodiment, the fourth processing time threshold may be based on processing profiles of a set of computationally intensive applications, e.g., HDR algorithms, benchmark applications, etc. The fourth threshold may be set at a time when a certain percentage of those target applications have completed (e.g., 70%, 80%, 90%, 95%, etc.). However, in one embodiment, a fourth processing time threshold may not be determined or used.

Figure 6:
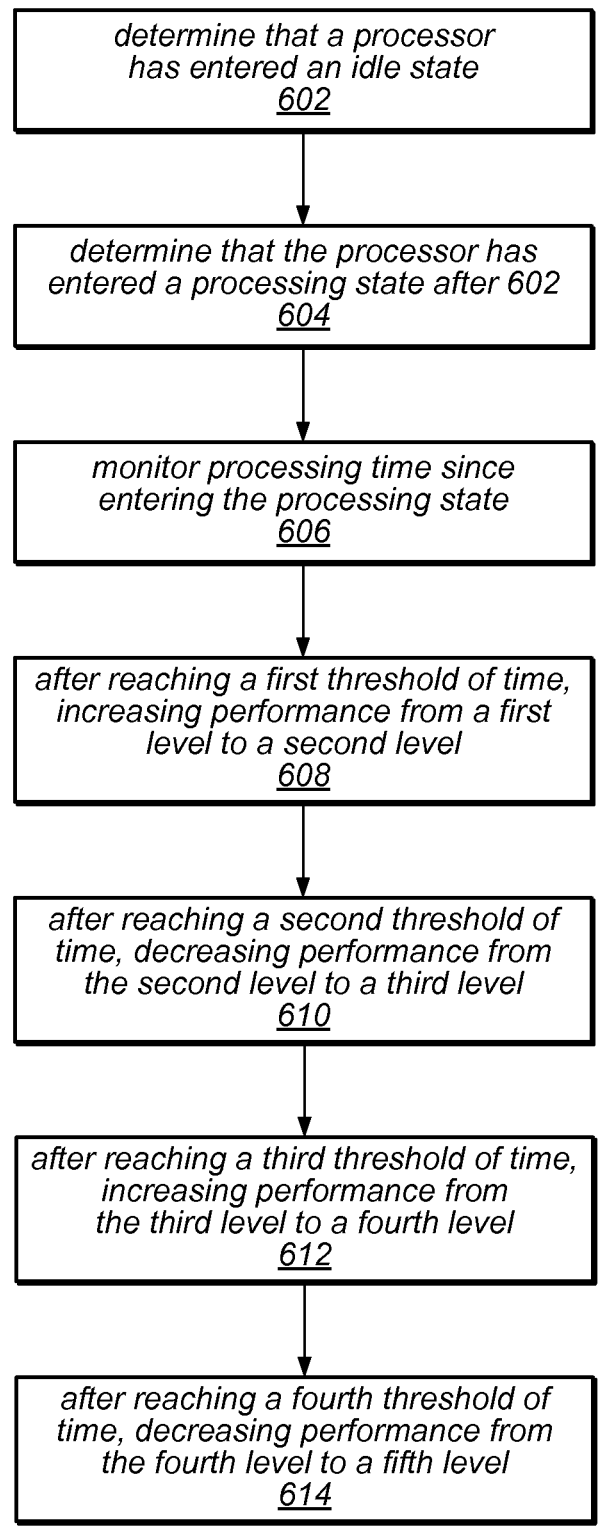
FIG. 6 is a flow diagram of one embodiment for controlling processor performance.

In 412, the first, second, third, and/or fourth thresholds may be used to control processor performance of a device. FIG. 6 is a flowchart illustrating this use and is described in more detail below.

The definition of the thresholds may be performed in a variety of manners. For example, the definition of the thresholds may be provided for the entirety of the device, which may be used each time the processor enters a processing state in the manner described in FIG. 6.

In alternate embodiments, the threshold(s) may be defined for each application or type of application. For example, the analysis above may be used for individual applications (or types of applications), although some modifications may be necessary. For example, the first and/or second thresholds for a single application (or type of application) may be defined as the minimum and maximum (or a certain number of standard deviations away from the average) of the processing time distribution of the application(s). Additionally, individual applications may also indicate or provide an application type (e.g., low processing requirement, high processing requirement, variable processing requirement, etc.), target frame rate (e.g., 30 fps, 60 fps, etc.), processing profile (e.g., one generated by the developer), or other information that may be used to define the thresholds for the application. However, it should be noted that in some embodiments, only the first threshold may vary from application to application (or type to type), and the second threshold may not vary, e.g., where it is based on a desired characteristic. Accordingly, the methods above may only be used to determine a subset of the thresholds (e.g., the first threshold) rather than all of the thresholds. In one embodiment, the second threshold may still vary if the desired characteristic changes from application to application (or type to type), as desired.

In further embodiments, the thresholds may be generated dynamically, while the device is executing one or more applications. For example, the device may use a trailing window of processing times (e.g., for consecutive processing states) to dynamically calculate the one or more of the thresholds for the current processes (e.g., by creating a processing profile similar to 402 and calculating the first threshold in 404). However, in one embodiment, the second threshold may remain static and one or more of the other thresholds may be dynamically varied. The trailing window of processing times may vary or may be static as desired. For example, the trailing window may be defined over a specified time period (e.g., processing times only within the last 100 ms, 500 ms, 1 s, 5 s, 20 s, 30 s, etc.) are used. Alternatively, the trailing window of processing times may vary according to when applications are initiated. For example, processing profile may encompass all processing times since initiation of the application that is currently executing on the device. Other methods for determining the time frame or window of the processing profile are envisioned.

Thus, the thresholds may be defined and used according to a variety of different embodiments.

FIG. 6—Controlling Processor Performance Using First and Second Thresholds

FIG. 6 illustrates one embodiment of a method for controlling processor performance using first and second thresholds. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, the method may determine that a processor has entered an idle state. For example, as indicated above, the kernel (or some other entity, whether it be software or hardware) may monitor when the processor is in an idle state or processing state.

In 604, the method may determine that the processor has entered a processing state after entering the idle state (e.g., that the processor has exited the idle state of 602). In some embodiments, it may not be necessary to monitor when the processor enters an idle state, but when the processor enters a processing state. In one embodiment, the kernel may provide an indication to a power management driver (or other entity, hardware or software) that the processor has entered the processing state.

In 606, processing time since entering the processing state may be monitored. For example, the power management driver may begin a timer since 604 to keep track of the amount of time that has elapsed since entering the processing state in 604. The processing time may only be monitored during the processing state entered in 604. For example, the timer may be stopped when the processor enters an idle state and reset when the processor enters a next processing state.

In 608, after reaching a first threshold of time (e.g., the first threshold determined in 404), performance of the processor may be increased from a first performance level to a second performance level. For example, the power management driver may compare the current processing time to the first threshold. Once the first threshold has been reached, the power management driver may provide a signal, e.g., to a power management circuit (or some other entity) to increase from the first performance level to the second performance level. The power management driver may indicate the desired level (e.g., low, medium, high), a desired voltage for the processor(s), and/or a desired clock speed for the processor(s), among other possibilities. Accordingly, the power management circuit may modify the performance of the processor(s) in the desired manner.

The first performance level may be a "low" performance level. For example, since the first threshold typically demarcates the upper limit of applications with low processing requirements, the first performance level may be a relatively low state since such applications do not need a higher performance level. Accordingly, once the first threshold of time has been reached, it may be inferred that the current application is not a low processing requirement application and a higher performance level may be necessary. Accordingly, the performance level of the processor may be increased to the second performance level. In some embodiments, the second processing level may be an "unsustainable" processing level. The term "unsustainable processing level" refers to a processing level that is not sustainable for an indefinite period of time. For example, the second processing level may be unsustainable according to various criteria, such as temperature, battery life, etc. With specific regard to temperature, running the processor at the higher performance level may cause the processor or other circuitry to overheat if continued for a long period of time. As one specific example, thermally unsustainable performance levels may drive temperature to the limit (e.g., according to customer satisfaction, safety, hardware specified range, etc.) in 100s of ms to seconds or even minutes. With regard to battery life, running the processor at the higher performance level may cause the battery to deplete too quickly. More specifically, as one specific example, the battery life may reduce overall run time by a few hours out of ten when operating at the higher performance level. Unsustainable processing levels may refer to unsustainable voltage levels for the processor and/or unsustainable clock speeds for the processor, among other possibilities.

In 610, after reaching a second threshold of time (e.g., the second threshold determined in 406), performance of the processor may be decreased from the second performance level to a third performance level. The third performance level may be higher than the first performance level. Similar to 608, 610 may be performed by the power management driver providing the desired performance level (via whatever manner, such as a generic indication of performance level, specification of voltage, specification of clock speed, etc.) to the power management circuit, which in turn may make the desired change.

The third performance level may be a "mid" performance level. More specifically, since the second threshold of time typically indicates a desired characteristic (e.g., a desired frame rate), if the processing has not completed by the second threshold of time, the application may have already missed the desired performance. For example, in the case of a desired frame rate of 60 fps, if the processing time has exceeded 16.6 ms, then the frame is already late for a rate of 60 fps. Accordingly, the boost in performance given by the second performance level is no longer necessary to achieved the desired characteristic. Thus, in 610, the performance level is decreased from the second to the third performance level. In one embodiment, the third performance level may be a sustainable performance level that can be maintained for an indefinite period of time. However, the third performance level may generally be higher than the first performance level since the "low processing requirements" time frame has already been exceeded.

In 612, after reaching a third threshold of time (e.g., the third threshold determined in 408), performance of the processor may be increased from the third performance level to a fourth performance level. In one embodiment, the fourth performance level may be the same as the second performance level, although they may be different in other embodiments. In one embodiment, the fourth performance level may be an unsustainable performance level, similar to the second performance level discussed above. The fourth performance level may allow computationally intensive algorithms (e.g., non-user performance applications), such as HDR algorithms, benchmarks applications, graphics applications, mathematic routines, etc. to execute with a high performance level, which may lead to a better user experience and/or better performance. For example, by boosting the power level for these types of applications, better benchmarks may be generated, HDR processing time may be decreased, mathematical routines may be finished in a more expedient manner, etc.

As indicated above, the third threshold of time may be in a different domain than the first and second thresholds. For example, the third threshold may occur near the second mark or may at least be in the 100s of milliseconds, compared to the low millisecond times for the first and second thresholds.

Similar to 608, 612 may be performed by the power management driver providing the desired performance level (via whatever manner, such as a generic indication of performance level, specification of voltage, specification of clock speed, etc.) to the power management circuit, which in turn may make the desired change.

Finally, after reaching a fourth threshold of time (e.g., the fourth threshold determined in 410), performance of the processor may be decreased from the fourth performance level to a fifth performance level. In one embodiment, the fifth performance level may be the same as the third performance level, although they may be different in other embodiments. Generally, the final performance level (in this case the fifth performance level) may be a sustainable performance level that can be maintained for an indefinite period of time.

In one embodiment, the fourth threshold of time may be in a different domain than the third threshold of time. For example, the fourth threshold may occur near the minute mark or may at least be in the 10s of seconds, compared to the seconds time domain of the third threshold. The fourth threshold and fifth performance level may be used to ensure that the device does not overheat, battery consumption is reduced, etc. Additionally, the lowering of the fourth performance level to the fifth performance level may ensure that applications that simply run indefinitely are not "rewarded" by receiving high performance levels when using inefficient algorithms.

In one embodiment, rather than stepping down from the fourth performance level to the fifth performance level, the performance level may be reduced over time from the fourth performance level to the fifth performance level. For example, a linear or non-linear reduction may be used rather than a step function. Further, in one embodiment, the fourth threshold of time and fifth processing level may simply be omitted.

Similar to 608, 614 may be performed by the power management driver providing the desired performance level (via whatever manner, such as a generic indication of performance level, specification of voltage, specification of clock speed, etc.) to the power management circuit, which in turn may make the desired change.

Figure 7A:
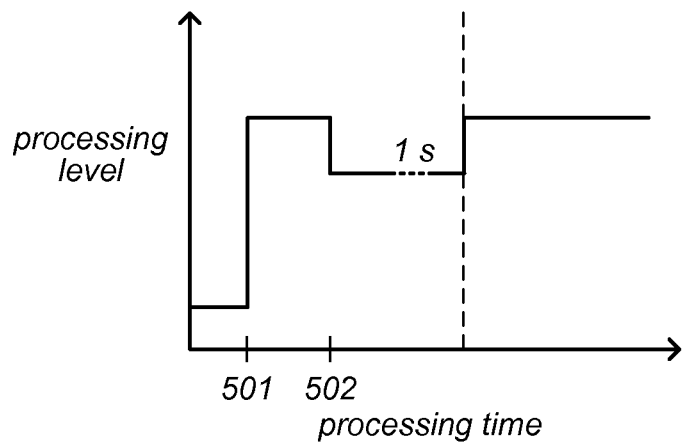
FIGS. 7A-7C are exemplary graphs illustrating processor performance levels over time ("performance profiles") according to embodiments of the method of FIG. 6.
Figure 7B:
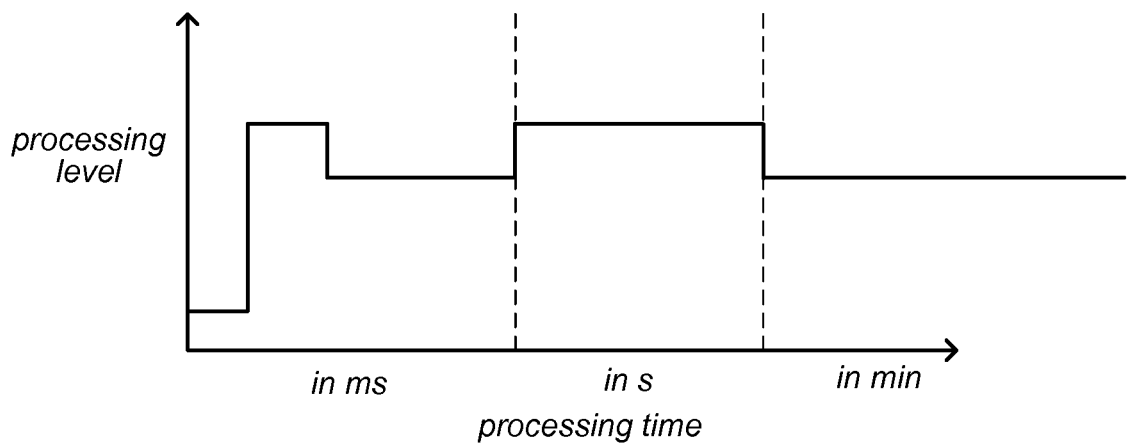
Figure 7C:
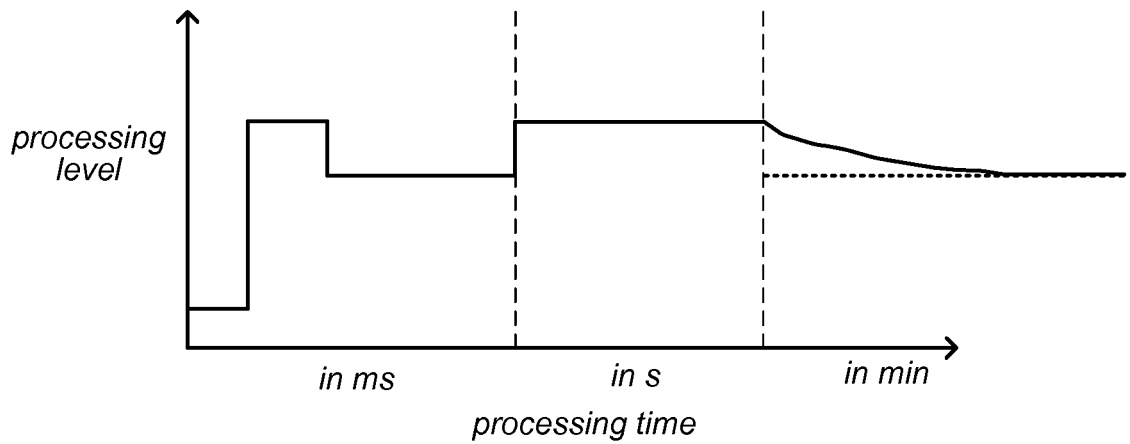

FIG. 7A illustrates an exemplary performance profile corresponding to 602-612 of the method of FIG. 6. As shown, before the first threshold, the processor(s) operate at a first performance level (e.g., a "low" processing level). After reaching the first threshold, the processor(s) operate at a second processing level which is higher than the first processing level (e.g., a "high" processing level). After reaching the third threshold, the processor(s) operate at a third processing level (e.g., a "mid" processing level) which is in between the first and second processing levels in terms of performance. Finally, after nearing or reaching the "seconds" domain, the fourth threshold is reached, and the processing level is increased from the third processing level to the second processing level. In FIGS. 7B and 7C, the fourth threshold is reached (e.g., at the minutes domain) and the performance level is decreased to the third processing level. In FIG. 7B, the change is performed in a step-wise manner, while in FIG. 7C, the change is performed over time, in a non-linear manner. Any of various methods for changing the performance level over time are envisioned, not only the one shown in FIG. 7C.

In some embodiments, the methods of FIGS. 4 and 6 may be extended to include more thresholds and more complex performance profiles, as desired. For example, an additional threshold may be used to emphasis another characteristic (e.g., 30 fps versus 60 frames per second). In such embodiment, the second performance level may be decreased to a lower performance level that is still above the third performance level until the 30 fps mark is reached.

Other types of performance profiles are envisioned, e.g., with multiple lower level thresholds (e.g., for different levels of applications with low processing requirements), further higher performance level thresholds, further changes to the performance level after desired characteristics have been accounted for, etc. In general, any type of performance profile may be used.

While FIG. 6 is described with respect to a single processor, the method may be performed for multiple processors. For example, the method may be performed for each processor individually, e.g., where 602-614 is performed for each processor, or for the group, e.g., where 602-614 is performed for the group as a whole rather than for individual ones of the processors.

Further Embodiments

While the above descriptions provide embodiments that relate to monitoring and controlling performance levels of processors, the methods may be applied to any device or circuit. Such devices or circuits may meet the following criteria:

1) The time required to complete a job is not known until the work is complete.
2) The time to complete the job contributes to the overall performance and cadence of the system (or device).
3) The time to complete the job depends on the performance of the circuit/device.
4) The performance of the circuit/device can be managed and includes multiple performance levels, some of which may not be sustainable.
5) Some agent (hardware or software) can monitor the states of the circuit/device and control its performance.

Exemplary circuits that meet the above requirements include GPUs, video encoders, video decoders, DSPs, Image Signal Processors, etc.

Advantages of the Described Embodiments

Typical prior art performance management systems (e.g., power management systems) simply increase performance level as the processing time increases. However, these types of performance management systems generally reward applications that are inefficient or poorly designed, which is not desirable. Additionally, these methods do not specifically target or reward specific types of applications, such as the desired characteristic applications at the second threshold of time and/or the computationally intensive algorithms at the third threshold of time. Accordingly, the method described above attempts to maintain efficiency (by not providing increased performance to applications which have low processing requirements) while also providing performance increases to achieve desired characteristics (such as a desired graphics frame rate) and allow effective execution of computationally intensive algorithms. Accordingly, applications which are able to achieve the desired characteristics are rewarded, while those that simply continue to process indefinitely may not.

Additionally, by providing a performance level increase in the manner described above, those applications that are close to achieving the desired characteristic without the power management scheme may be able to with the increased performance. For example, a game that is designed to run at a graphics frame rate of 60 fps, but is actually running at 55 fps may be able to achieve the desired 60 fps due to the increased performance between the first and second thresholds.

Finally, the computationally intensive algorithms are able to complete more quickly, leading faster completion of these algorithms, which may be beneficial for benchmark performance, completion of graphics processing (e.g., allowing a better user experience by completing HDR processing more quickly), etc. Additionally, this change may not effect the power impact to power sensitive workloads or user perceived performance workloads (e.g., those affected by the first and second thresholds).

Numerous variations and modifications will become apparent to those skilled in the art once the above disclosure is fully appreciated. It is intended that the following claims be interpreted to embrace all such variations and modifications.

What is claimed is:

1. A method for controlling performance of a processor of a device, comprising:
   determining that the processor has entered a processing state after an idle state, wherein the processor initially operates at a first performance level in the processing state;
   in response to the processor entering the processing state, monitoring processing time of the processor since entering the processing state;
   in response to the processing time exceeding a first threshold of time, increasing performance of the processor to a second processing level that is greater than the first processing level;
   in response to the processing time exceeding a second threshold of time that is greater than the first threshold of time, decreasing performance of the processor to a third processing level that is less than the second processing level but greater than the first level;
   in response to the processing time exceeding a third threshold of time that is greater than the second threshold of time, increasing performance of the processor to a fourth processing level that is greater than the third processing level.

2. The method of claim 1, wherein the fourth processing level is the same as the second processing level.

3. The method of claim 1, further comprising:
   in response to the processing time exceeding a fourth threshold of time that is greater than the third threshold of time, decreasing performance of the processor to a fifth processing level that is less than the fourth processing level.

4. The method of claim 3, wherein the fourth processing level is the same as the third processing level.

5. The method of claim 1, wherein the second performance level is not a sustainable processing level, wherein the first performance level and the third performance level are sustainable processing levels.

6. The method of claim 1, wherein the processor initially operating at the first performance level comprises the processor operating at a first voltage level, wherein said increasing the performance of the processor to the second processing level comprises increasing the first voltage level to a second voltage level, wherein said decreasing the performance of the processor to the third processing level comprises decreasing the second voltage level to a third voltage level, wherein said increasing the performance of the processor to a fourth level comprises increasing the third voltage level to a fourth voltage level.

7. The method of claim 1, wherein the first threshold of time is determined based on analysis of processing profiles of a plurality of different applications.

8. The method of claim 1, wherein the second threshold of time is determined based on a desired frame rate of an application executing on the processor.

9. The method of claim 1, wherein the third threshold of time is based on computationally intensive algorithms.

10. The method of claim 1, wherein said determining, said monitoring, said increasing performance, said decreasing performance, and said increasing performance is performed for a plurality of processors of the device.

11. A system for controlling processor performance, comprising:
one or more processors;
a power manager circuit coupled to the one or more processors, wherein the power manager circuit is configured to control a voltage level of the one or more processors;
one or more memory mediums coupled to the one or more processors, wherein the one or more memory mediums store program instructions executable by at least one of the one or more processors to:
determine that at least a first processor of the one or more processors has exited an idle state;
in response to the first processor exiting the idle state, monitor processing time of at least the first processor since existing the idle state;
in response to the processing time exceeding a first threshold of time, provide a first signal to the power manager circuit, wherein, in response to the first signal, the power manager circuit is configured to increase the voltage level of at least the first processor from a first voltage level to a second voltage level; and
in response to the processing time exceeding a second threshold of time that is greater than the first threshold of time, provide a second signal to the power manager circuit, wherein, in response to the second signal, the power manager circuit is configured to decrease the voltage level of at least the first processor from the second voltage level to a third voltage level, wherein the third voltage level is greater than the first voltage level;
in response to the processing time exceeding a third threshold of time that is greater than the second threshold of time, provide a third signal to the power manager circuit, wherein, in response to the third signal, the power manager circuit is configured to increase the voltage level of at least the first processor from the third voltage level to a fourth voltage level.

12. The system of claim 11, wherein the fourth voltage level is the same as the second voltage level.

13. The system of claim 11, wherein the program instructions are further executable by the at least one of the one or more processors to:
in response to the processing time exceeding a fourth threshold of time that is greater than the third threshold of time, provide a fourth signal to the power manager circuit, wherein, in response to the fourth signal, the power manager circuit is configured to decrease the voltage level of at least the first processor from the fourth voltage level to a fifth voltage level, wherein the fifth voltage level is less than the second voltage level.

14. The system of claim 11, wherein the program instructions comprise a power manager driver, wherein the power manager driver is executable to perform said providing the first signal, the second signal, and the third signal.

15. The system of claim 11, wherein the power manager circuit is further configured to control a clock speed of the one or more processors, wherein, in response to the first signal, the power manager circuit is configured to increase the clock speed of at least the first processor from a first clock speed to a second clock speed, wherein, in response to the second signal, the power manager circuit is configured to decrease the clock speed of at least the first processor from the second clock speed to a third clock speed, wherein the third clock speed is greater than the first clock speed, and wherein, in response to the third signal, the power manager circuit is configured to decrease the clock speed of at least the first processor from the second clock speed to a third clock speed.

16. The system of claim 11, wherein the first threshold of time is based on processing profiles of a plurality of low processing requirements.

17. The system of claim 11, wherein the second threshold of time is based on a desired performance characteristic of applications executing on the one or more processors.

18. The system of claim 17, wherein the performance characteristic comprises a desired graphics frame rate.

19. The system of claim 18, wherein the desired graphics frame rate comprises one of 60 frames per second.

20. The system of claim 11, wherein the first and second threshold are within a first time domain, wherein the third threshold is within a second time domain.

21. The system of claim 11, wherein the second voltage level and the third voltage levels are unsustainable voltage levels.

22. A non-transitory, computer-accessible memory medium storing program instructions for controlling performance of a circuit, wherein the program instructions are executable to:
determine that the circuit has entered a processing state after an idle state, wherein the circuit initially operates at a first performance level in the processing state;
in response to the circuit entering the processing state, monitor processing time of the circuit since entering the processing state;
in response to the processing time exceeding a first threshold of time, increase performance of the circuit to a second processing level that is greater than the first processing level, wherein the second processing level is above a sustainable processing level;
in response to the processing time exceeding a second threshold of time that is greater than the first threshold of time, decrease performance of the circuit to a third processing level that is less than the second processing level but greater than the first level, wherein the third processing level is a sustainable processing level;
in response to the processing time exceeding a third threshold of time that is greater than the second threshold of time, increase performance of the circuit to the second processing level, wherein the fourth processing level is above the sustainable processing level.

23. The non-transitory, computer-accessible memory medium of claim 22, wherein the program instructions are further executable to:
   in response to the processing time exceeding a fourth threshold of time that is greater than the third threshold of time, decrease performance of the circuit to the third processing level.

24. The non-transitory, computer-accessible memory medium of claim 22, wherein increasing performance of the circuit comprises increasing a voltage level of the circuit.

25. The non-transitory, computer-accessible memory medium of claim 22, wherein increasing performance of the circuit comprises increasing a clock speed of the circuit.

* * * * *